(12) United States Patent
Lin

(10) Patent No.: US 7,253,673 B2
(45) Date of Patent: Aug. 7, 2007

(54) MULTI-PHASE CLOCK GENERATOR AND GENERATING METHOD FOR NETWORK CONTROLLER

(75) Inventor: Shian-Ru Lin, Nan-Tou Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 11/307,657

(22) Filed: Feb. 16, 2006

(65) Prior Publication Data
US 2006/0186940 A1    Aug. 24, 2006

(30) Foreign Application Priority Data
Feb. 18, 2005    (TW) .............. 94104809 A

(51) Int. Cl.
*G06F 1/04*    (2006.01)
(52) U.S. Cl. ........................ 327/295; 327/231
(58) Field of Classification Search .................. None
See application file for complete search history.

(56) References Cited
U.S. PATENT DOCUMENTS

| | | | | |
|---|---|---|---|---|
| 5,319,369 A | * | 6/1994 | Majos et al. | 341/101 |
| 5,375,258 A | * | 12/1994 | Gillig | 455/87 |
| 5,930,689 A | * | 7/1999 | Wilhite et al. | 455/126 |
| 6,016,422 A | * | 1/2000 | Bartusiak | 455/76 |
| 6,061,418 A | * | 5/2000 | Hassoun | 377/47 |
| 6,392,462 B2 | * | 5/2002 | Ebuchi et al. | 327/295 |
| 6,400,754 B2 | * | 6/2002 | Fleming et al. | 375/140 |
| 6,690,223 B1 | * | 2/2004 | Wan | 327/251 |
| 6,844,765 B2 | * | 1/2005 | Sasaki | 327/258 |
| 6,900,681 B2 | * | 5/2005 | Takano | 327/175 |
| 7,031,222 B1 | * | 4/2006 | Charagulla et al. | 365/233 |

OTHER PUBLICATIONS

US 6,246,273, 06/2001, Wodnicki et al. (withdrawn)

* cited by examiner

*Primary Examiner*—Cassandra Cox
(74) *Attorney, Agent, or Firm*—Winston Hsu

(57) ABSTRACT

The present invention discloses a multi-phase clock generator of a network controller for generating a set of multi-phase clocks, and a method thereof. The multi-phase clock generator includes a first gating element and a second gating element. The first gating element operates according to a first control clock and generates a first output clock of the set of multi-phase clocks according to an input clock. The second gating element operates according to a second control clock and generates a second output clock of the set of multi-phase clocks according to the first output clock. The second control clock is an inverted signal of the first control clock.

20 Claims, 3 Drawing Sheets

MULTI-PHASE CLOCK GENERATOR AND GENERATING METHOD FOR NETWORK CONTROLLER

BACKGROUND OF THE INVENTION

1. Field of the Invention

The present invention relates to generation of multi-phase clocks, and more particularly, to a multi-phase clock generator utilized in a network controller and method thereof.

2. Description of the Prior Art

Multi-phase clock generators are devices utilized to produce multiple clocks having the same frequency but different phases. Typically, the different clock signals produced by multi-phase clock generators can be referred to as a set of multi-phase clocks. The production of multi-phase clocks is an important task when proceeding with the control of slew rate.

Network controllers often produce multi-phase clocks by utilizing multi-phase clock generators. An Ethernet transmitter, for example, operating under 10M mode, requires multi-phase clocks with frequencies of 250 MHz, duty cycles of 50%, and the phase difference between any two adjacent clocks must be one nanosecond. Additionally, under Giga/100M, the Ethernet transmitter requires multi-phase clocks with frequencies of 125 MHz, duty cycles of 25%, and the phase difference between any two adjacent clocks must be one nanosecond.

Usually, network controllers will produce the multi-phase clocks by utilizing phase lock loop or delay lock loop. Unfortunately, both of these methods, to produce the multi-phase clocks, require complex circuit architecture and consume significant power.

SUMMARY OF THE INVENTION

It is therefore an objective of the claimed invention to provide a multi-phase clock generator set in a network controller and related method for simplifying the required related circuit design and reducing the power dissipation.

The claimed invention discloses a multi-phase clock generator set in a network controller, for generating a set of multi-phase output clocks. The multi-phase clock generator comprises: a first gating element operating according to a first control clock and generating a first output clock of the set of multi-phase output clocks according to an input clock; and a second gating element coupled to the first gating element, operating according to a second control clock and generating a second output clock of the set of multi-phase output clocks according to the first output clock. The second control clock is an inverted signal of the first control clock.

Furthermore, the claimed invention discloses a method utilized in a network controller for generating a set of multi-phase output clocks. The method comprises: gating an input clock according to a first control clock to generate a first output clock of the set of multi-phase output clocks; and gating the first output clock according to a second control clock to generate a second output clock of the set of multi-phase output clocks. The second control clock is an inverted signal of the first control clock.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
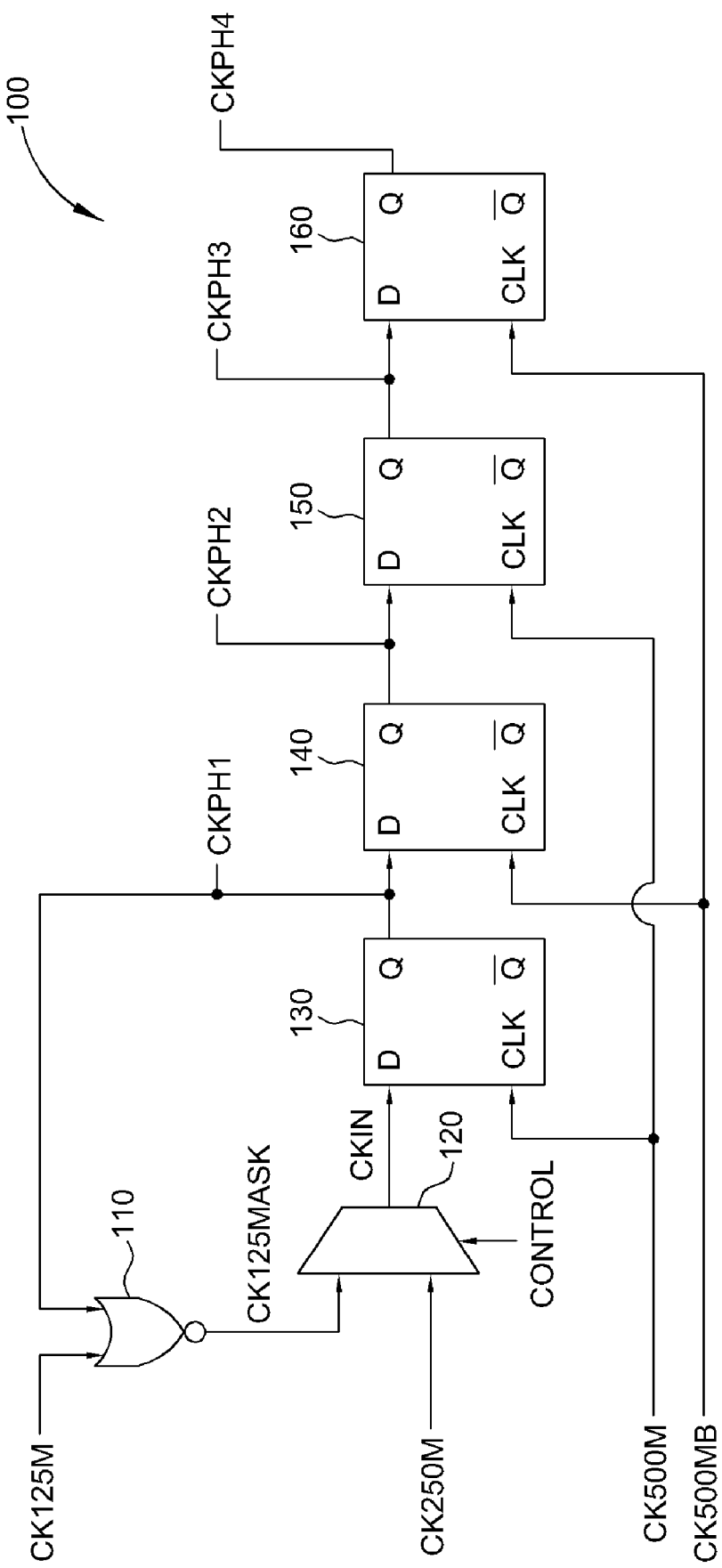
FIG. 1 shows a multi-phase clock generator according to an embodiment of the present invention.

Please refer to FIG. 1. FIG. 1 shows a multi-phase clock generator according to an embodiment of the present invention. The multi-phase clock generator is set inside a network controller. In this example, the network controller is an Ethernet transmitter. More specifically, each of the communication channels in the Ethernet transmitter includes a multi-phase clock-generating device as shown in FIG. 1. In FIG. 1, a multi-phase clock generator 100 includes a NOR gate 110, a multiplexer 120, a first gating element 130, a second gating element 140, a third gating element 150, and a fourth gating element 160. In this example, all gating elements are D-type flip-flops, however, in the present invention the gating elements are not limited to D-type flip-flops. In other embodiments, the other types of flip-flop can be used for implementing the present invention.

As shown as FIG. 1, the frequency of a first control clock CK500M is 500 MHz and its duty cycle is 50%. A second control clock CK500MB is the reverse signal of the first control clock CK500M. A second reference clock CK250M is the clock generated through dividing the frequency of the first control clock CK500M by two, in other words, the frequency of the second reference clock CK250M is 250 MHz. A clock CK125M is generated through dividing the frequency of the second reference clock CK250M by two, in other words, the frequency of the frequency-divided clock CK125M is 125 MHz. Except for the various elements as shown in FIG. 1, the present invention can utilize an extra circuit to synchronously generate the first control clock CK500M, the second control clock CK500MB, the second reference clock CK250M, and the frequency-divided clock CK125M satisfying the aforementioned relations, according to a basic clock having a frequency of 500 MHz and a duty cycle of 50%. The clocks generated by the extra circuit can then be utilized by the multi-phase clock generator 100 in FIG. 1. Since designing the extra circuit is quite a simple job for those who are skilled in the art, further description is omitted here for brevity. A set of multi-phase clocks generated by the multi-phase clock generator 100 includes a first output clock CKPH1, a second output clock CKPH2, a third output clock CKPH3, and a fourth output clock CKPH4.

The NOR gate 110 performs a NOR operation on the first output clock CKPH1 and the frequency-divided clock CK125M which results in the production of a first reference clock CK125MASK. The multiplexer 120 receives the first reference clock CK125MASK and the second reference clock CK250M. According to a mode control signal CONTROL, multiplexer 120 selectivity outputs the CK125MASK or CK250M to be an input clock CKIN of the first D-type flip-flop 130. More specifically, when the control signal CONTROL corresponds to a first network transmission mode of the Ethernet transmitter (such as a 10M mode), the multiplexer 120 selects the second reference clock CK250M to be the input clock CKIN. The multiplexer 120 selects the first reference clock CK125MASK to be the input to clock CKIN when the control signal CONTROL corresponds to a second network transmission mode of the Ethernet transmitter (such as a Giga/100M mode).

The first D-type flip-flop 130 operates according to the first control clock CK500M and generates the first output clock CKPH1 according to the input clock CKIN. The second D-type flip-flop 140 operates according to the second control clock CK500MB and generates the second output clock CKPH2 according to the first output clock CKPH1. The third D-type flip-flop 150 operates according to the first control clock CM500M and generates the third output clock CKPH3 according to the second output clock CKPH2. The fourth D-type flip-flop 160 operates according to the second control clock CK500MB and generates the fourth output clock CKPH4 according to the third output clock CKPH3. In other words, the first D-type flip-flop 130 gates the input clock CKIN according to the first control clock CK500M to generate the first output clock CKPH1. The second D-type flip-flop 140 gates the first output clock according to the second control clock CK500MB to generate the second output clock CKPH2. The third D-type flip-flop 150 gates the second output clock CKPH2 according to the first control clock CK500M to generate the third output clock CKPH3. The fourth D-type flip-flop 160 gates the third output clock CKPH3 according to the second control clock CK500MB to generate the output clock CKPH4. Please note, those who are skilled in the art can easily add additional gating elements behind the fourth D-type flip-flop 160 of FIG. 1 to generate other clocks having other different phases.

Figure 2:
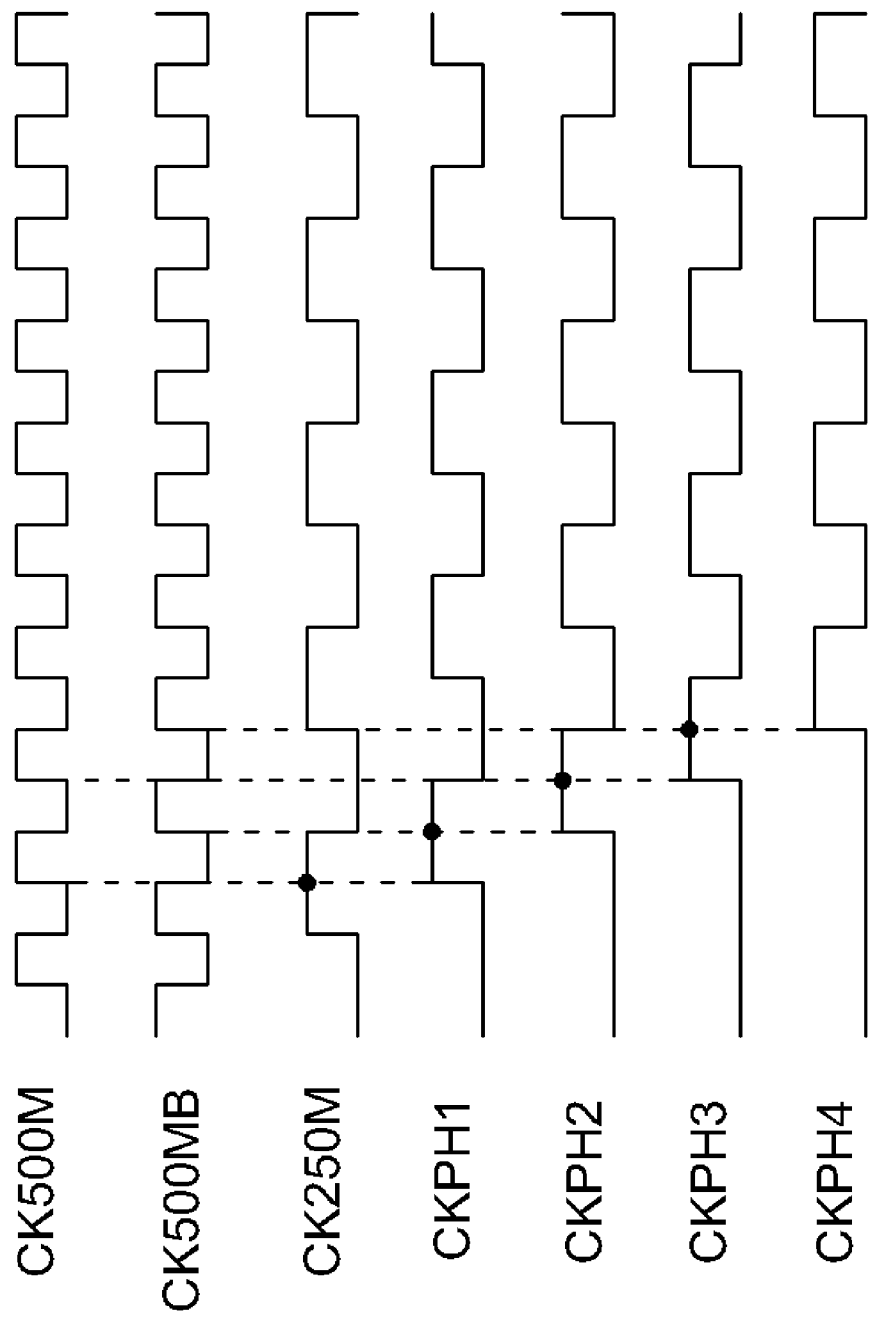
FIG. 2 shows a timing diagram of each clock shown in FIG. 1 when the Ethernet transmitter is operating in 10M mode.
Figure 3:
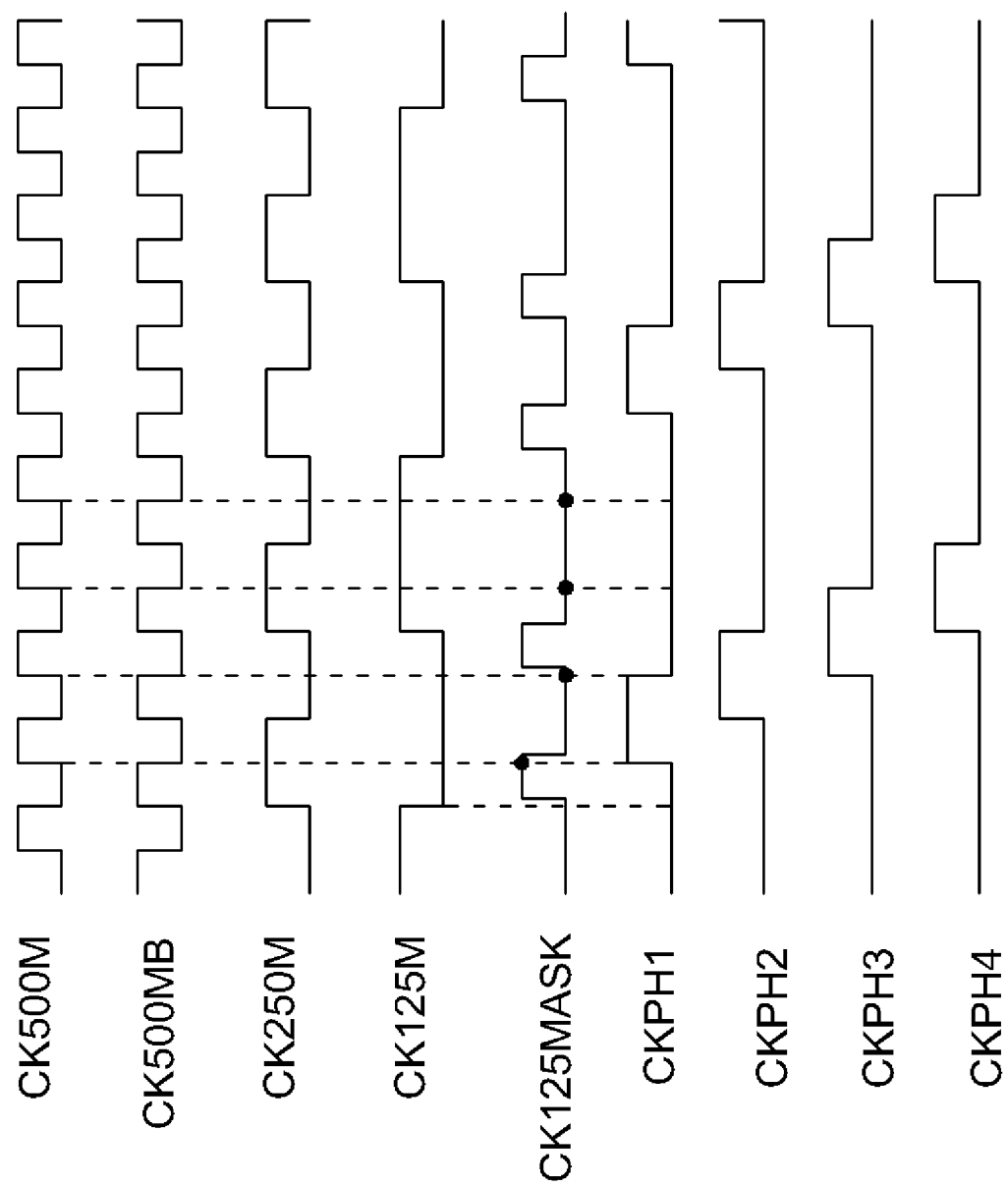
FIG. 3 shows a timing diagram of each clock in FIG. 1 when the Ethernet transmitter is operating in Giga/100M mode.

As mentioned above, the multiplexer 120 selects the second reference clock CK250M to be the input clock CKIN when the Ethernet transmitter operates in 10M mode at which point the timing relations of each signal in FIG. 1 will be as shown in FIG. 2. The output clocks generated by the D-type flip-flops will have a frequency of 250 MHz and a duty cycle of 50%. The phase difference between two adjacent output clocks is one nanosecond. The multiplexer 120 selects the first reference clock CK125MASK to be the input to clock CKIN when the Ethernet transmitter operates in 1 Giga/100M mode and at this time the timing relations of each signal in FIG. 1 are as shown in FIG. 3. The output clocks generated by each D-type flip-flops will have a frequency of 125 MHz and a duty cycle of 25%. The phase difference between two adjacent output clocks is one nanosecond.

The prior art utilizes phase lock loop or delay lock loop to generate multi-phase clocks in network controllers. In contrast, the present invention utilizes a plurality of gating elements (at least two gating elements) to generate the multi-phase clocks for network controllers. Additionally, advantages of the present invention include: reduced circuit power consumption, simplified circuit architecture, and generating multi-phase clocks for network controllers operating under two different modes (e.g., 10M and Giga/100M) utilizing a single set of circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-phase clock generator set in a network controller, for generating a set of multi-phase output clocks, the multi-phase clock generator comprising:

a first gating element operating according to a first control clock and generating a first output clock of the set of multi-phase output clocks according to an input clock, the input clock being selected from a first reference clock and a second reference clock, frequencies of the first and second reference clocks being smaller than a frequency of the first control clock; and a second gating element coupled to the first gating element, operating according to a second control clock and generating a second output clock of the set of multi-phase output clocks according to the first output clock.

2. The multi-phase clock generator of claim 1, wherein the first and second gating elements are flip-flops.

3. The multi-phase clock generator of claim 1, further comprising:

a third gating element coupled to the second gating element, operating according to the first control clock and generating a third output clock of the set of multi-phase output clocks according to the second output clock; and a fourth gating element coupled to the third gating element, operating according to the second control clock and generating a fourth output clock of the set of multi-phase output clocks according to the third output clock.

4. The multi-phase clock generator of claim 3, wherein the first, second, third, and fourth gating elements are flip-flops.

5. The multi-phase clock generator of claim 1, further comprising:

a multiplexer for receiving the first and second reference clocks and selectively outputting the first or second reference clock to the first gating element according to a mode control signal;

wherein the mode control signal corresponds to a first network transmission mode or a second network transmission mode.

6. The multi-phase clock generator of claim 1, wherein a duty cycle of the set of multi-phase output clocks changes according to the input clock.

7. The multi-phase clock generator of claim 1, further comprising:

a multiplexer coupled to the first gating element for receiving the first reference clock and the second reference clock, and selectively sending the first reference clock or the second reference clock to the first gating element as the input clock; and a NOR gate coupled to the first gating element and the multiplexer for generating the first reference clock according to the first output clock and a frequency divided clock.

8. The multi-phase clock generator of claim 7, wherein the frequency of the second reference clock is substantially half of the frequency of the first control clock and a frequency of the frequency divided clock is substantially half of the frequency of the second reference clock.

9. The multi-phase clock generator of claim 7, wherein the network controller is an Ethernet controller.

10. The multi-phase clock generator of claim 1, wherein a frequency of the set of multi-phase output clocks changes according to the input clock.

11. The multi-phase clock generator of claim 1, wherein the second control clock is an inverted signal of the first control clock.

12. A method utilized in a network controller for generating a set of multi-phase output clocks, the method comprising:

receiving a first reference clock and a second reference clock;

outputting the first reference clock or second reference clock to be an input clock according to a mode control signal, the mode control signal corresponding to a first network transmission mode or a second network transmission mode;

gating the input clock according to a first control clock to generate a first output clock of the set of multi-phase output clocks; and gating the first output clock according to a second control clock to generate a second output clock of the set of multi-phase output clocks.

13. The method of claim 12, further comprising:

gating the second output clock according to the first control clock to generate a third output clock of the set of multi-phase output clocks; and gating the third output clock according to the second control clock to generate a fourth output clock of the set of multi-phase output clocks.

14. The method of claim 12, further comprising:

performing a NOR operation on the first output clock and a frequency divided clock to generate the first reference clock; and selecting the first reference clock or the second reference clock to be the input clock.

15. The method of claim 14, wherein a frequency of the second reference clock is substantially half of a frequency of the first control clock, and a frequency of the frequency divided clock is substantially half of the frequency of the second reference clock.

16. The method of claim 12, wherein frequencies of the first and second reference clocks are smaller than a frequency of the first control clock.

17. The method of claim 12, wherein a duty cycle of the set of multi-phase output clocks changes according to the input clock.

18. The method of claim 12, wherein a frequency of the set of multi-phase output clocks changes according to the input clock.

19. The method of claim 12, wherein the steps of gating the input clock and the first output clock are realized by using a plurality of flip-flops.

20. The method of claim 12, wherein the second control clock is an inverted signal of the first control clock.

* * * * *